United States Patent
Herbst et al.

(10) Patent No.: US 7,506,002 B2
(45) Date of Patent: Mar. 17, 2009

(54) EFFICIENT DELETION OF ARCHIVED DATA

(75) Inventors: Axel Herbst, Eppingen (DE); Jan Nolte-Boemelburg, Bad Schoenborn (DE)

(73) Assignee: SAP AG, Walldorf (DE)

( * ) Notice: Subject to any disclaimer, the term of this patent is extended or adjusted under 35 U.S.C. 154(b) by 506 days.

(21) Appl. No.: 10/712,472

(22) Filed: Nov. 12, 2003

(65) Prior Publication Data

US 2005/0071383 A1    Mar. 31, 2005

Related U.S. Application Data

(60) Provisional application No. 60/507,258, filed on Sep. 29, 2003.

(51) Int. Cl.
*G06F 17/30* (2006.01)
(52) U.S. Cl. .................. 707/200; 707/103 R; 707/203; 707/8
(58) Field of Classification Search ......... 707/200–204, 707/8, 103 R–103 Z; 709/203
See application file for complete search history.

(56) References Cited

U.S. PATENT DOCUMENTS

| | | | | |
|---|---|---|---|---|
| 5,548,750 | A * | 8/1996 | Larsson et al. | 707/204 |
| 5,926,809 | A | 7/1999 | Szalwinski | 707/3 |
| 6,049,803 | A | 4/2000 | Szalwinski | 707/100 |
| 6,078,933 | A | 6/2000 | Szalwinski | 707/204 |
| 6,240,427 | B1 | 5/2001 | Szalwinski et al. | 707/204 |
| 6,266,679 | B1 | 7/2001 | Szalwinski et al. | 707/204 |
| 6,725,218 | B1 * | 4/2004 | Podanoffsky | 707/10 |
| 6,915,314 | B2 * | 7/2005 | Jackson et al. | 707/204 |
| 7,035,866 | B1 * | 4/2006 | Chen et al. | 707/102 |
| 2003/0004975 | A1 * | 1/2003 | Nakano et al. | 707/200 |
| 2005/0091195 | A1 * | 4/2005 | Sarashetti | 707/3 |

FOREIGN PATENT DOCUMENTS

EP    1 324 215 A1    12/2001

OTHER PUBLICATIONS

Chudnow, C., "Active Archiving-Storage," LookSmart, Find Articles, Computer Technology Review, Feb. 2002, pp. 3, http://64.241.242.253/p/articles/mi_OBRZ/is_2_22/ai_110113790.

Chudnow, C., "Active Archiving-Storage," LookSmart, Find Articles, Computer Technology Review, Feb. 2002, pp. 3, http://64.241.242.253/p/articles/mi_OBRZ/is_2_22/ai_110113790/pg3.

Beacon Application Services Corporation, "Princeton Softech Announces General Availability of Archive For Servers Peoplesoft Edition," Jan. 21, 2003, pp. 3, www.beaconservices.com/news04.htm.

(Continued)

*Primary Examiner*—Cheryl Lewis
(74) *Attorney, Agent, or Firm*—Blakely, Sokoloff, Taylor & Zafman LLP

(57) ABSTRACT

A method and apparatus for deleting archived data are disclosed. Identification keys of archived data objects to be deleted from a database are requested. At least one data object identified in response to a request for the identification keys is deleted while additional identification keys of data objects to be deleted are requested.

25 Claims, 4 Drawing Sheets

OTHER PUBLICATIONS

EDP Weekly's IT Monitor, "Princesont Softech's Archive for DB2 release 5.1," LookSmart, Find Articles, Feb. 3, 2003, pp. 3, www.findarticles.com/p/articels/mi_m0GZQ/is_5_44/ai_97285013.

DBReview, "Princeton Softech Delivers Interated Database ARchiving for PeopleSoft DB2 Mainfram Sites," Online News pbulished in DMReview.com, Sep. 19, 2003, pp. 2, www.dmreview.com/article_sjb.cfm?articleId=7380.

Zimmermann, H., et al., "IXOS—A Brief History," Feb. 28, 1988, pp. 4, www.ixos.com/local/us/home-c1/company/com-history.htm.

* cited by examiner

EFFICIENT DELETION OF ARCHIVED DATA

This application claims the benefit of U.S. Provisional Application Ser. No. 60/507,258, filed Sep. 29, 2003.

FIELD

Embodiments of the invention pertain to the fields of data processing. More particularly, embodiments of the invention relate to data archival.

BACKGROUND

In today's corporate world, businesses keep large volumes of various data, such as accounting information, customer information, business specific data. With the growth of these volumes of data, management of databases of the business systems becomes more problematic. In order to minimize access times and costs, some business systems move dormant "read-only" data into dedicated archive systems, which are less expensive than the main database systems. For example, the archived data may be stored on cheaper storing medias, such as tapes and disks. The archiving of data provides businesses with long-term access to various data that may be required to be accessed in the future, for example, in a legal proceeding.

There are existing archiving system solutions on the market. These archiving system solutions perform archiving operations by selecting data objects from a database and writing the data objects into archive files, upon which, the corresponding data objects are deleted from the database, after ensuring that the data was successfully written into the archive files. Data objects written into a single archive file are processed by a single delete job, i.e. a computer process. Thus, a single delete job is required for every newly created archive file in order to delete the archived data objects from the database. Moreover, the deletion operations in these archiving systems do not halt until all the data objects written into a single archive file are deleted from the database. The number of the created delete jobs and the duration of execution of the created delete jobs may affect the overall system performance. For example, a large number of delete jobs may affect the allocation of processing resources, if delete jobs are occupying resources necessary for more important system processes. However, in the archiving systems currently utilized on the market, the system managers are not provided with any options to configure the archive system to control the number of delete jobs created, and thus are not able to control allocation of processing resources and overall system performance.

Alternatively, some existing archiving systems store data to be archived in a marked-up form, for example in an Extensible Markup Language (XML) form, by creating an archived XML object for each data object to be archived. In these systems, there is a delete job created for each XML object, i.e. for each data object to be archived. Thus, the number of the created delete jobs in these systems is even greater than in the systems storing data objects in the archive files, and the above-stated problems are aggravated.

What is needed, therefore, is a solution that overcomes these and other shortcomings of the prior art.

SUMMARY

A method and system for deleting archived data are disclosed. Embodiments of the invention include requesting identification keys of archived data objects to be deleted from a database. Embodiments of the invention further include deleting at least one data object identified in response to a request for the identification keys while requesting additional identification keys of data objects to be deleted.

BRIEF DESCRIPTION OF THE DRAWINGS

The invention is illustrated by way of example and not limitation in the figures of the accompanying drawings, in which like references indicate similar elements and in which.

DETAILED DESCRIPTION

A method and apparatus for deletion of archived data are described. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those skilled in the art. Thus, the invention can include any variety of combinations and/or integrations of the embodiments described herein.

It will be appreciated that the term "data object", as used herein, means one or more records of business data. The term "record", as used herein, means a compilation of business data, for example, a document, a portion of a document, several documents, etc. For example, a record may be a name and a phone number from a phone book, and the data object may be a compilation of records of a sales department in an organization.

Exemplary Architecture

Figure 1:
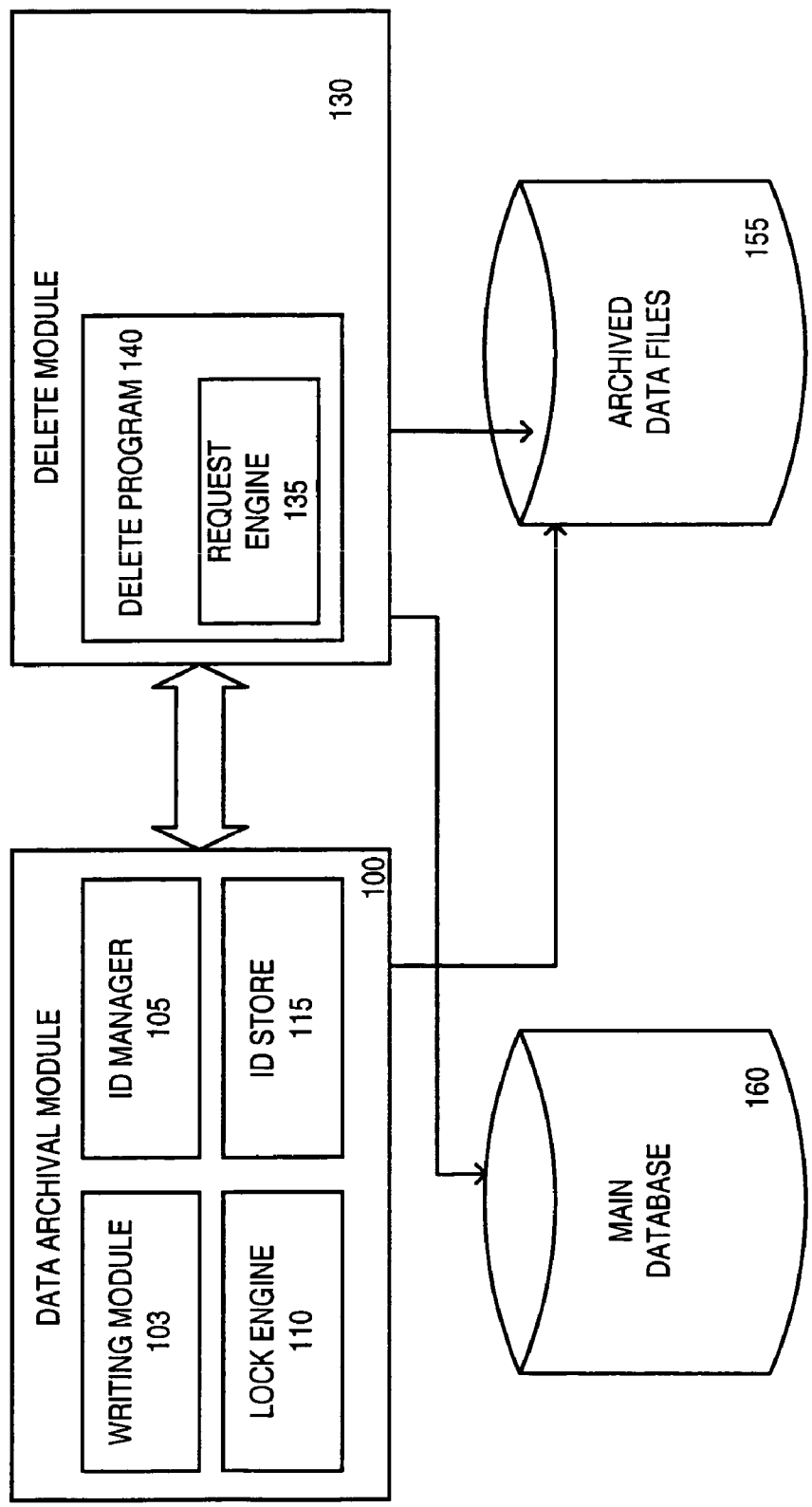
FIG. 1 illustrates components of an archiving system according to one embodiment of the invention.

FIG. 1 illustrates components of the archiving system according to one embodiment of the invention. A data archival module 100 includes a writing module 103 to write data objects to be archived into archived data files 155. The data archival module 100 also includes identification (ID) manager 105 for assigning and deleting identification keys (IDs) to data objects to be archived. The identification keys are stored in an ID store database 115. The data archival module 100 includes a lock engine 110 for locking data objects selected for archival from subsequent pick requests, as described below. A delete module 130 includes a delete program 140 deleting the selected data objects from the main database 160. The delete program 140 includes a request engine 135 requesting IDs of data objects to be deleted. The functions of these and other components of the invention are described in detail below.

It will be appreciated that the components of the invention may be distributed among several processing systems, or may be located on a single processing system. Additionally, a server-client configuration may be used, wherein some components of the invention reside at a server machine and some component of the invention reside at a client machine.

Methodology

Figure 2:
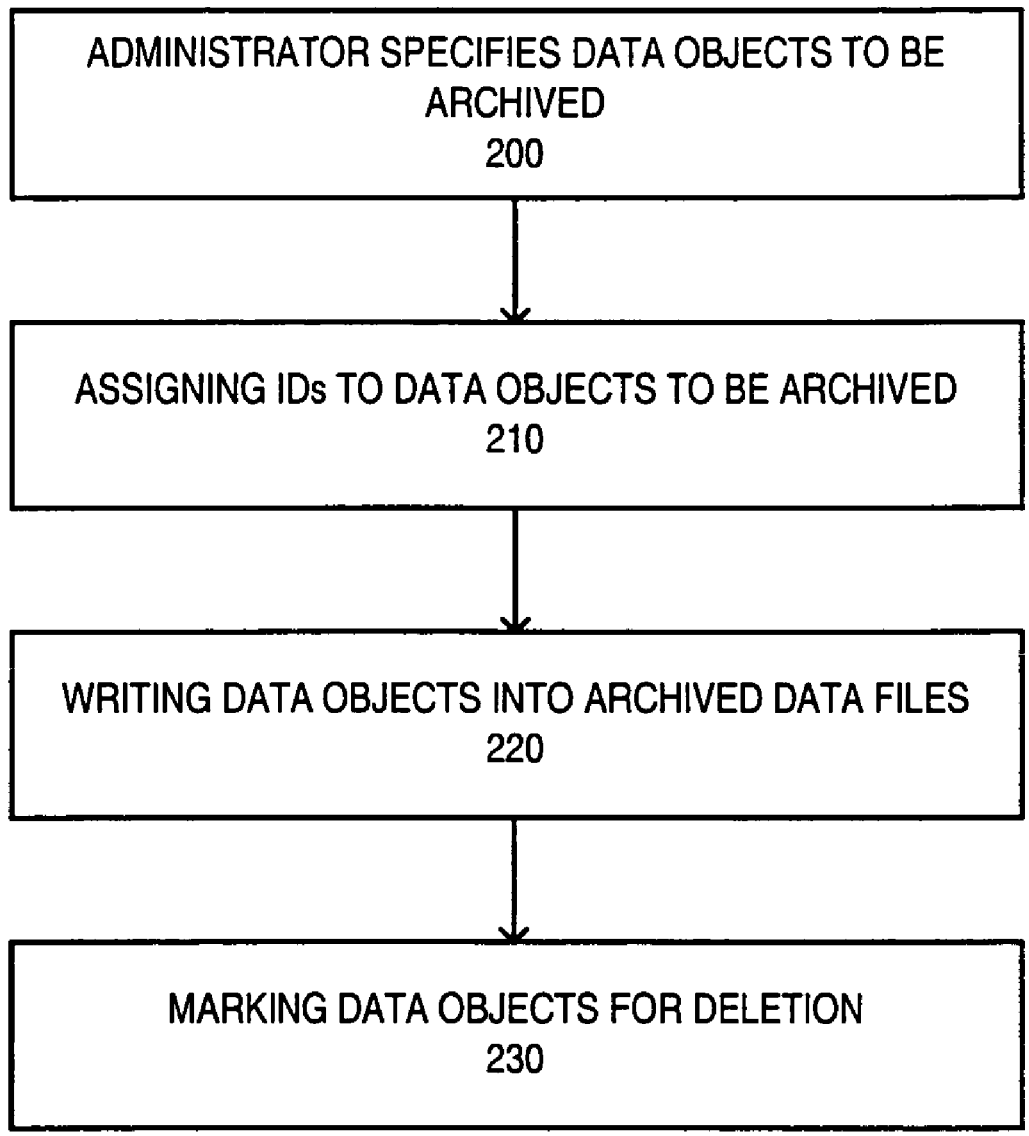
FIG. 2 is a flow diagram of archiving process according to one embodiment of the invention.

With these concepts in mind, embodiments of the invention may be further described with reference to FIG. 2. At 200 the system administrator specifies data objects to be archived. The system administrator may specify the data object to be archived via an interface, or via command-lines. For example, the system administrator may select business documents for the fiscal year 1998-1999 to be archived. The writing module 103 selects data objects corresponding to the business documents for the fiscal year 1998-1999 to be archived. Prior to writing the selected data objects into the archived data files 155, the writing module 103 notifies the ID manager 105 of the data objects to be deleted from the main database 160. Upon receiving the notification, the ID manager 105 assigns IDs to the data objects to be deleted at 210. Once the data objects are successfully written into the archived data files 155 at 220, the ID manager at 230 marks the IDs of the data objects as available for deletion. The IDs of the data objects to be deleted may be stored in an ID Store 115 relational table or database. It will be appreciated that the IDs may be assigned to the data objects after the data objects are written into the archived data files. It will also be appreciated that a single archived file may include several archived data objects or a single data object in a marked up form, for example an XML form.

In one embodiment, a plurality of delete jobs are executing in parallel, the number of which is specified by the system administrator. Prior to creating delete jobs, the system administrator may determine whether the system resources have to be allocated to more important processes, in which case, the system administrator specifies the number of delete jobs to be performed accordingly.

Figure 3:
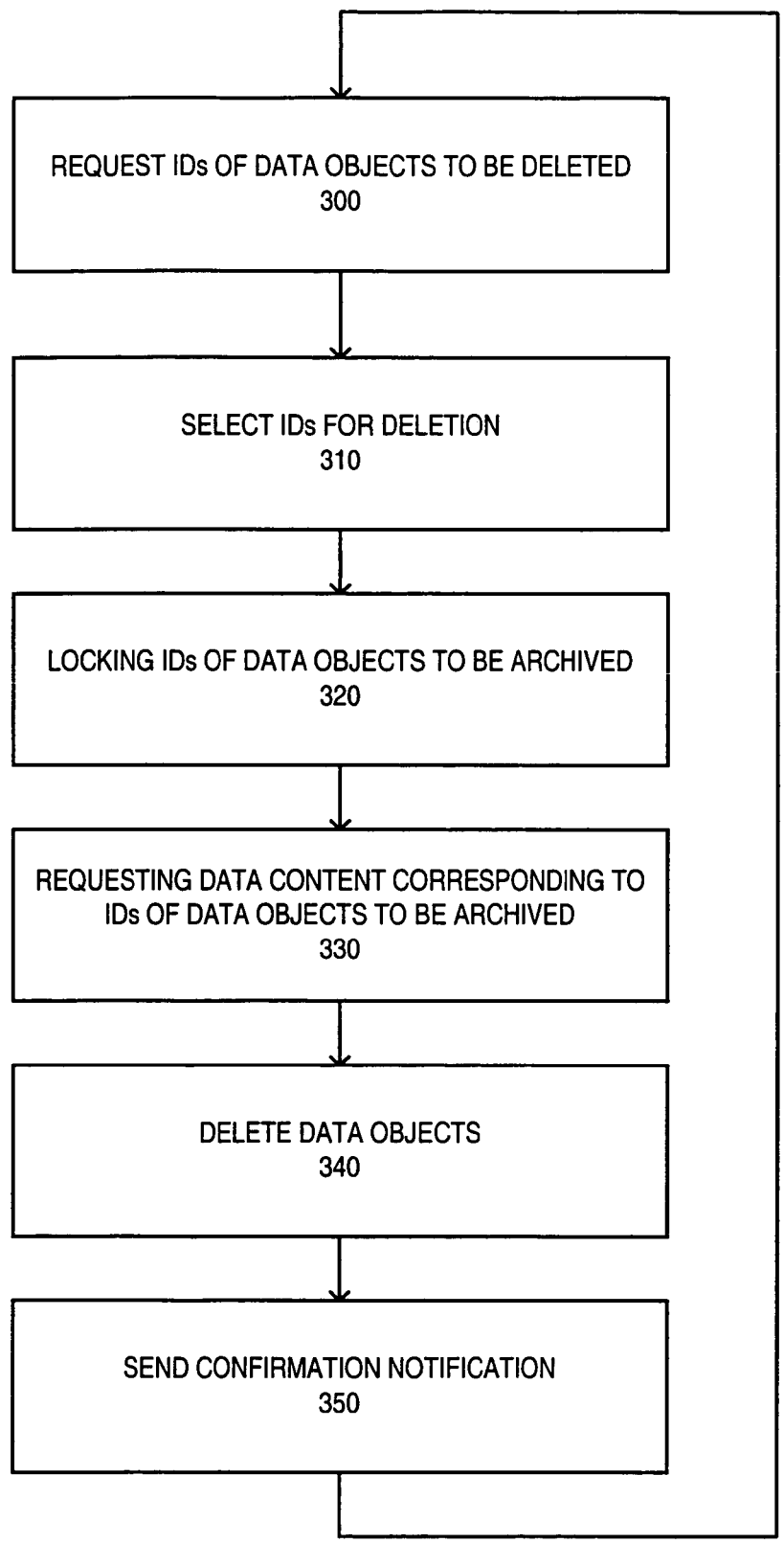
FIG. 3 is a flow diagram of a data deletion process according to one embodiment of the invention.

Functions of a delete program are now described according to one embodiment of the invention. Once the data objects are marked as available for deletion, the delete module 130 may delete the data objects from the main database. In one embodiment at 300 of FIG. 3, the request engine 135 requests IDs of data objects to be deleted from the data archival module 100 by issuing a command, for example, a PICK command. In one embodiment, the request engine continuously issues requests to the data archival module 100 for IDs of data objects to be deleted until a response returns no further IDs. For example, upon deletion of data objects identified in response to a first PICK command, a second PICK command is issued, and if more IDs are returned in response to the second PICK command, the deletion operation is performed, otherwise the delete program is terminated. It will be appreciated that delete jobs may not delete an equal number of data objects, for example, a faster executing delete job may go through a greater number of PICK command iterations than a slower executing delete job, causing the faster executing delete job to delete more data objects than the slower executing delete job.

At 310 the data archival module selects unlocked IDs from the ID Store 115 and provides the selected IDs to the delete module 130 for deletion in response to the PICK request. In one embodiment the IDs are selected from the ID Store 115 based on a system administrator configurable parameters. For example, the system administrator may specify a maximum number of IDs to be returned in response to a single PICK command. In another embodiment, the IDs are selected based on a relationship between the subject matter of the data objects. For example, the data objects may be grouped according to logical partitions known to the archiving system. For instance, if all the financial documents for the fiscal year 1998-1999 are to be archived, the documents referring to the same account may make up a partition. In this embodiment the data archival module 100 provides the delete program 140 with IDs that belong to the same partition in response to the PICK request.

At 320 upon the selection of IDs of data objects to be deleted, the lock engine 110 locks the IDs and/or the data objects to ensure that no PICK commands are issued again against these Ids and/or data objects. Locked IDs indicate that the data objects corresponding to the IDs are being currently deleted by other delete jobs and these locked IDs are not selected for deletion in response to subsequent PICK requests.

According to one embodiment, at 330 the delete program 140 sends a request to the data archival module 100 for the content of data objects corresponding to the received IDs. Alternatively, the delete program 140 may obtain the contents of the data objects to be archived by directly accessing the archived data files 155. Yet, alternatively, the delete program 140 may deduce the location of the content of the data objects to be archived from the IDs assigned to the data objects. For example, IDs may represent location path of data objects, such that if location of the data objects to be deleted is /root/my_system/session4711/, and folder 4711 includes several data objects to be deleted, booking1, booking2, etc., the IDs assigned to these data objects are /root/my_system/session4711/booking1, /root/my_system/session4711/booking2, etc. Utilizing these IDs the delete module 130 deduces the location of contents of the data objects from the IDs.

Once the delete program 140 obtains the content of the data objects to be deleted, the delete program 140 deletes the data objects form the main database 160 at 340 upon confirming that the content to be deleted corresponds to the content of the data objects written in the archived data files 155. Upon deletion of the data objects, the delete program 140 at 350 sends a confirmation message to the data archival module 100, to confirm the deletion of the selected data objects and resumes issuing the PICK command as described above. Upon receipt of the confirmation message, the data archival module 100 deletes the identification keys associated with the deleted data objects from the ID store 115. In one embodiment, the data archival module 100 issues a deletion confirmation message to the system administrator notifying the system administrator that the selected data objects were successfully archived and deleted from the main database.

Figure 4:
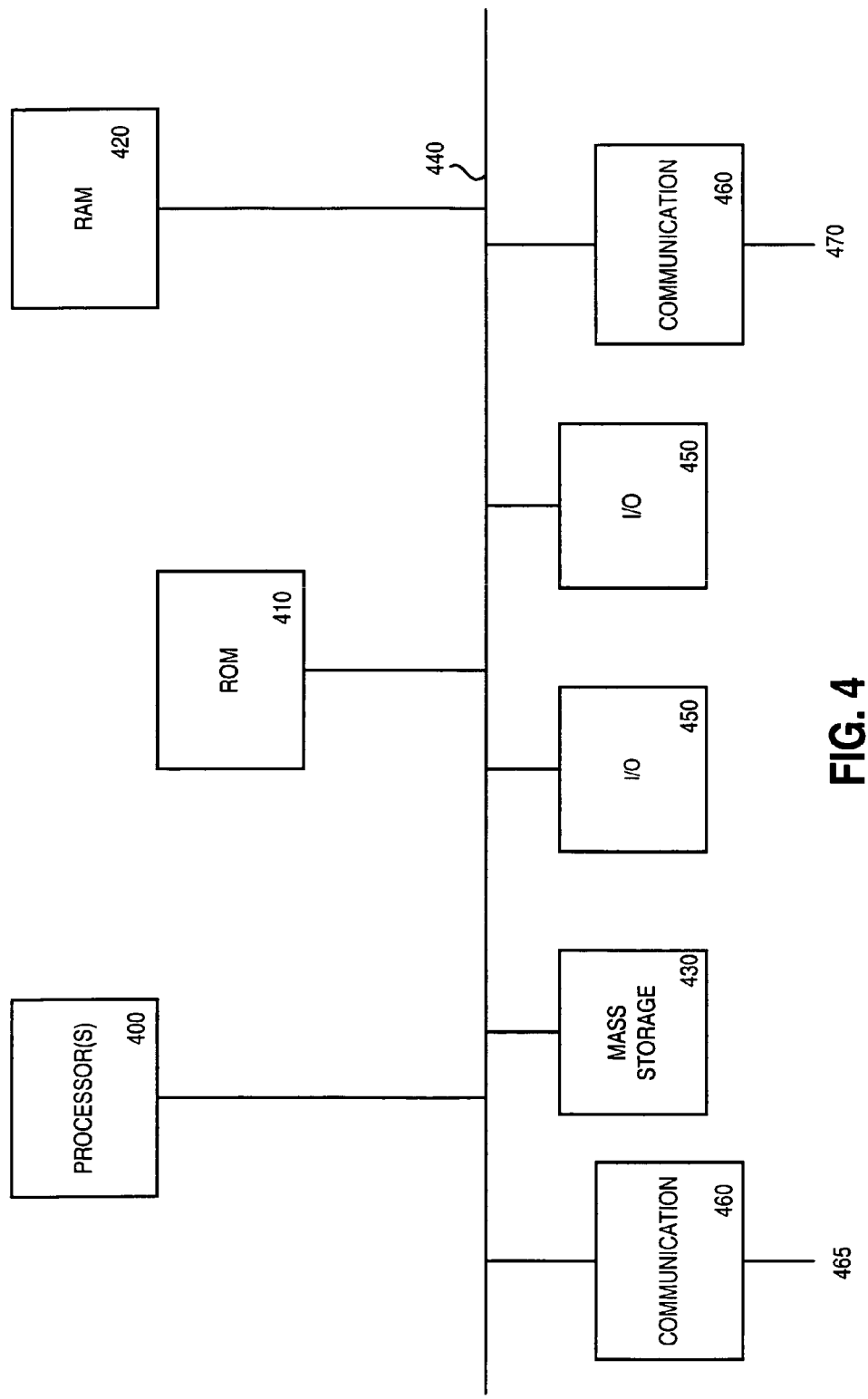
FIG. 4 illustrates an exemplary processing system according to one embodiment of the invention.

It will be appreciated that physical processing systems, which embody components of the archiving system described above, may include processing systems such as conventional personal computers (PCs), embedded computing systems and/or server-class computer systems according to one embodiment of the invention. FIG. 4 illustrates an example of such a processing system at a high level. The processing system of FIG. 4 may include one or more processors 400, read-only memory (ROM) 410, random access memory (RAM) 420, and a mass storage device 430 coupled to each other on a bus system 440. The bus system 440 may include one or more buses connected to each other through various bridges, controllers and/or adapters, which are well known in the art. For example, the bus system 440 may include a 'system bus', which may be connected through an adapter to one or more expansion buses, such as a peripheral component interconnect (PCI) bus or an extended industry standard architecture (EISA) bus. Also coupled to the bus system 440 may be the mass storage device 430, one or more input/output (I/O) devices 450 and one or more data communication devices 460 to communicate with remote processing systems via one or more communication links 465 and 470, respectively. The I/O devices 450 may include, for example, any one or more of: a display device, a keyboard, a pointing device (e.g., mouse, touch pad, trackball), and an audio speaker.

The processor(s) 400 may include one or more conventional general-purpose or special-purpose programmable microprocessors, digital signal processors (DSPs), application specific integrated circuits (ASICs), or programmable logic devices (PLID), or a combination of such devices. The mass storage device 430 may include any one or more devices suitable for storing large volumes of data in a non-volatile manner, such as magnetic disk or tape, magneto-optical storage device, or any of various types of Digital Video Disk (DVD) or Compact Disk (CD) based storage or a combination of such devices.

The data communication device(s) 460 each may be any device suitable to enable the processing system to communicate data with a remote processing system over a data communication link, such as a wireless transceiver or a conventional telephone modem, a wireless modem, an Integrated Services Digital Network (ISDN) adapter, a Digital Subscriber Line (DSL) modem, a cable modem, a satellite transceiver, an Ethernet adapter, Internal data bus, or the like.

It will be recognized that many of the features and techniques described above may be implemented in software. For example, the described operations may be carried out in a processing system in response to its processor(s) executing sequences of instructions contained in memory of the device. The instructions may be executed from a memory such as RAM and may be loaded from a persistent store, such as a mass storage device, and/or from one or more other remote processing systems. Likewise, hardwired circuitry or firmware may be used in place of software, or in combination with software, to implement the features described herein. Thus, the invention is not limited to any specific combination of hardware circuitry and software, nor is it limited to any particular source of software executed by the processing systems.

Thus, a method and apparatus for deletion of archived data have been described. Although the invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method, comprising:
 a) assigning an identifier for a data object and storing said identifier, said data object stored in a database;
 b) providing said identifier in response to a request requesting one or more identifiers of one or more data objects to be deleted, locking said identifier, and confirming that content of an archived version of said data object corresponds to said data object's content; and,
 c) deleting said data object from said database and deleting said identifier.

2. The method of claim 1 further comprising marking said data object as available for deletion after said version of said data object has been archived.

3. The method of claim 1 wherein said storing of said identifier further comprises storing said identifier into a relational database.

4. The method of claim 1 further comprising determining if a computing system that uses information stored in said database is currently sufficiently under-utilized to permit performing a), b) and c).

5. The method of claim 1 further comprising repeatedly performing the following:
 issuing a request to a software module that performs said storing and said locking, said request requesting one or more identifiers of data objects marked for deletion and deleting a corresponding one or more data objects identified by said one or more identifiers.

6. The method of claim 5 wherein the number of said one or more identifiers is limited to a value specified by an administrator.

7. The method of claim 5 wherein said one or more data objects are within the same logical partition of said database.

8. The method of claim 1 further comprising:
 ai) assigning and storing a second identifier for a second data object, said second data object stored in a database;
 bi) locking said identifier and confirming that content of an archived version of said second data object corresponds to said second data object's content; and,
 ci) deleting said second data object from said database.
 wherein bi) is performed in parallel with c).

9. The method of claim 1 further comprising limiting the number of parallel deleting operations to a value specified by an administrator.

10. The method of claim 1 wherein said data object is formatted according to an XML format.

11. An article of manufacture comprising program code stored on a machine readable medium, said program code able to be processed by a machine, said program code being organized into:
 a first module comprising first program code that when processed by said machine perform a first method, comprising:
  assigning an identifier for a data object and storing said identifier, said data object stored in a database;
  providing said identifier in response to a request made by a second module requesting one or more identifiers of one or more data objects to be deleted, locking said identifier;
 a second module comprising second program code that when processed by said machine performs a second method, comprising:
  confirming that content of an archived version of said data object corresponds to said data object's content;
  deleting said data object;
 wherein said first method also includes deleting said identifier after said confirming.

12. The article of manufacture of claim 11 wherein said first method further comprises:
 receiving a request from said second software module, said request requesting the identity of data objects marked for deletion;
 responding to said request by providing to said second software module one or more identifiers identifying a corresponding one or more data objects marked for deletion.

13. The article of manufacture of claim 12 wherein said first method further comprises limiting the number of said one or more identifiers to a value specified by an administrator.

14. The article of manufacture of claim 13 wherein said first method is written to permit said first module to comprehend that said one or more data objects are within the same logical partition of said database.

15. The article of manufacture of claim 13 wherein said second method further comprises repeatedly issuing requests for the identity of data objects marked for deletion.

16. An article of manufacture comprising program code stored on a machine readable medium, said program code to implement a method when processed by a machine, said method comprising:
 a) assigning an identifier for a data object and storing said identifier, said data object stored in a database;

b) providing said identifier in response to a request requesting one or more identifiers of one or more data objects to be deleted, locking said identifier, and confirming that content of an archived version of said data object corresponds to said data object's content; and, c) deleting said data object from said database and deleting said identifier.

17. The method of claim 16 further comprising marking said data object as available for deletion after said version of said data object has been archived.

18. The method of claim 16 wherein said storing of said identifier further comprises storing said identifier into a relational database.

19. The method of claim 16 further comprising determining if a computing system that uses information stored in said database is currently sufficiently under-utilized to permit performing a), b) and c).

20. The method of claim 16 further comprising repeatedly performing the following:

issuing a request to a software module that performs said storing and said locking, said request requesting one or more identifiers of data objects marked for deletion and deleting a corresponding one or more data objects identified by said one or more identifiers.

21. The method of claim 20 wherein the number of said one or more identifiers is limited to a value specified by an administrator.

22. The method of claim 20 wherein said one or more data objects are within the same logical partition of said database.

23. The method of claim 16 further comprising:

ai) assigning and storing a second identifier for a second data object, said second data object stored in a database;

bi) locking said identifier and confirming that content of an archived version of said second data object corresponds to said second data object's content; and, ci) deleting said second data object from said database.

wherein bi) is performed in parallel with c).

24. The method of claim 16 further comprising limiting the number of parallel deleting operations to a value specified by an administrator.

25. The method of claim 16 wherein said data object is formatted according to an XML format.

* * * * *